US012205082B2

(12) United States Patent
Hosp et al.

(10) Patent No.: US 12,205,082 B2
(45) Date of Patent: Jan. 21, 2025

(54) SYSTEMS AND METHODS FOR SECURELY OPENING APIS WITH CARDHOLDER AUTHENTICATION AND CONSENT

(71) Applicant: Mastercard International Incorporated, Purchase, NY (US)

(72) Inventors: Adam Kenneth Hosp, Lake St. Louis, MO (US); Oran Cummins, Dublin (IE); Michael Hoole, Epsom (GB); Ahmed Hosny, Dublin (IE); Ishfaq Lone, Dublin (IE); Marco Vicente, Dublin (IE); Piyushkumar Kanubhai Hirpara, Dublin (IE); Kosta Krauth, New York, NY (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 17/490,413

(22) Filed: Sep. 30, 2021

(65) Prior Publication Data

US 2022/0108309 A1    Apr. 7, 2022

Related U.S. Application Data

(60) Provisional application No. 63/086,082, filed on Oct. 1, 2020, provisional application No. 63/232,880, filed
(Continued)

(51) Int. Cl.
*G06Q 20/02* (2012.01)
*G06Q 20/32* (2012.01)
(Continued)

(52) U.S. Cl.
CPC ......... *G06Q 20/02* (2013.01); *G06Q 20/3255* (2013.01); *G06Q 20/34* (2013.01);
(Continued)

(58) Field of Classification Search
CPC .............. G06Q 20/02; G06Q 20/3255; G06Q 20/4014; G06Q 20/42; H04L 63/083
See application file for complete search history.

(56) References Cited

U.S. PATENT DOCUMENTS

| 7,685,206 B1 | 3/2010 | Mathew et al. |
| 8,935,757 B2 | 1/2015 | Srinivasan et al. |

(Continued)

OTHER PUBLICATIONS

G. Thawre, N. Bahekar and B. R. Chandavarkar, "Use Cases of Authentication Protocols in the Context of Digital Payment System," 2020 11th International Conference on Computing, Communication and Networking Technologies (ICCCNT), 2020, pp. 1-6, doi: 10.1109/ICCCNT49239.2020.9225428. (Year: 2020).*
(Continued)

*Primary Examiner* — David P Sharvin
*Assistant Examiner* — Steven R Chism
(74) *Attorney, Agent, or Firm* — Hovey Williams LLP

(57) ABSTRACT

A computer system includes a database, a communication interface, and a processor(s). The processor(s) is programmed to receive a consent message from a cardholder computing device. The consent message includes cardholder consent information indicating consent to one or more data services. The processor(s) is also programmed to receive transaction card details from the cardholder computing device. The transaction card details correspond to a transaction card of a cardholder and are associated with a financial account of the cardholder. Based on the transaction card details, the processor(s) generates a digital access token. The digital access token is associated with the financial account and the cardholder consent information. The processor(s) stores the digital access token in the database, transmits a cardholder authentication request message to an issuer, and receives an authentication ID from the cardholder
(Continued)

computing device. The processor(s) authenticates the cardholder and transmits the digital access token to a third party provider.

4 Claims, 7 Drawing Sheets

Related U.S. Application Data on Aug. 13, 2021, provisional application No. 63/232,895, filed on Aug. 13, 2021.

(51) Int. Cl.
| | |
|---|---|
| *G06Q 20/34* | (2012.01) |
| *G06Q 20/38* | (2012.01) |
| *G06Q 20/40* | (2012.01) |
| *G06Q 20/42* | (2012.01) |
| *G06Q 40/02* | (2023.01) |
| *H04L 9/40* | (2022.01) |

(52) U.S. Cl.
CPC ....... *G06Q 20/382* (2013.01); *G06Q 20/3821* (2013.01); *G06Q 20/385* (2013.01); *G06Q 20/401* (2013.01); *G06Q 20/4014* (2013.01); *G06Q 20/40975* (2013.01); *G06Q 20/42* (2013.01); *G06Q 40/02* (2013.01); *H04L 63/083* (2013.01)

(56) References Cited

U.S. PATENT DOCUMENTS

| | | | |
|---|---|---|---|
| 10,692,085 B2 * | 6/2020 | Zagarese | G06Q 20/40145 |
| 10,692,138 B1 | 6/2020 | Nguyen et al. | |
| 11,146,398 B2 * | 10/2021 | Haque | H04L 9/3213 |
| 2012/0117626 A1 | 5/2012 | Yates et al. | |
| 2015/0039728 A1 | 2/2015 | Virieux | |
| 2015/0121462 A1 | 4/2015 | Courage et al. | |
| 2015/0127547 A1 | 5/2015 | Powell et al. | |
| 2015/0150106 A1 * | 5/2015 | Lund | H04L 63/083 726/7 |
| 2015/0150109 A1 * | 5/2015 | Bocanegra | H04L 63/0807 726/9 |
| 2016/0078428 A1 | 3/2016 | Moser et al. | |
| 2016/0092696 A1 * | 3/2016 | Guglani | G06F 21/606 726/26 |
| 2016/0285874 A1 * | 9/2016 | Smith | H04L 61/2589 |
| 2016/0307196 A1 | 10/2016 | Achhra et al. | |
| 2018/0341937 A1 * | 11/2018 | Kim | H04L 9/3297 |
| 2019/0058992 A1 * | 2/2019 | Kurian | H04W 12/06 |
| 2019/0333055 A1 | 10/2019 | Mohammed et al. | |
| 2020/0167780 A1 * | 5/2020 | Lock | G06Q 20/409 |

OTHER PUBLICATIONS

M. -Y. Wu and T. -H. Lee, "Design and implementation of cloud API access control based on OAuth," IEEE 2013 Tencon—Spring, Sydney, NSW, Australia, 2013, pp. 485-489, doi: 10.1109/TENCONSpring.2013.6584492. (Year: 2013).*
International Search Report and Written Opinion for PCT Application No. PCT/US2021/051190 (Dated Feb. 4, 2022).
Office Action from U.S. Appl. No. 17/490,520 (dated Jul. 24, 2023).

* cited by examiner

SYSTEMS AND METHODS FOR SECURELY OPENING APIS WITH CARDHOLDER AUTHENTICATION AND CONSENT

PRIORITY APPLICATIONS

The present application claims priority from U.S. Provisional Patent Application No. 63/086,082, filed Oct. 1, 2020, and entitled SYSTEMS AND METHODS FOR SECURELY OPENING APIS WITH CARDHOLDER AUTHENTICATION AND CONSENT; U.S. Provisional Patent Application No. 63/232,880, filed Aug. 13, 2021, and entitled SYSTEMS AND METHODS FOR MULTI ACCESS CHANNELS FOR AUTHENTICATION AND CONSENTS; and U.S. Provisional Patent Application No. 63/232,895, filed Aug. 13, 2021, and entitled SYSTEMS AND METHODS FOR CONSENT MANAGEMENT BY ISSUERS ON BEHALF OF CARDHOLDERS. The entire disclosure of each of the aforementioned priority applications is hereby incorporated by reference herein.

FIELD OF THE DISCLOSURE

The field of the disclosure relates to cardholder authentication and consent systems, and more particularly, to generating digital access tokens based on cardholder authentication and consent, where the digital access tokens are linked to application programming interface (API) calls to retrieve cardholder financial data.

BACKGROUND

The open banking concept in financial services is based, in part, on the use of open APIs allowing financial technology companies (Fintechs) and third party providers (TPPs) to build applications and services around financial institutions, increased financial transparency options for account holders, and the use of open source technology to implement these services and results. To provide such services, the Fintechs/TPPs require access to a cardholder's account data. However, cardholder authentication and consent is required before allowing Fintechs/TPPs access to cardholder data.

At least some known Fintechs/TPPs use a screen scraping approach to collect cardholder account data. Screen scraping is a process in which cardholders give Fintechs/TPPs their account credentials so the Fintechs/TPPs can log in and import account data into other programs. Screen scraping, however, can be unsafe. Providing online banking credentials to third parties exposes cardholders to the risk that a fraudster posing as a Fintech/TPP will dupe them, that a hacker will break into a Fintech's/TPP's system and steal the credentials, or that a rogue employee will abuse the access. Furthermore, providing online banking credentials to third parties could prevent banks from requiring certain kinds of multifactor authentication, such as biometrics. In addition, having a cardholder's online banking credentials allows the Fintechs/TPPs to take more consumer data than may be needed.

At least some banks provide cardholder account data to Fintechs/TPPs through an API gated by OAuth. OAuth is an open standard for token-based authentication and authorization on the Internet. Typically, with OAuth, a cardholder logs in to the Fintech/TPP (e.g., via an App) and is redirected to the cardholder's bank to authorize the Fintech/TPP to receive certain account data. However, in such a scenario, each bank must implement the OAuth standard in order for a Fintech/TPP to access cardholder account data. In addition, each Fintech/TPP must communicate directly with each bank associated with a cardholder account. The OAuth standard does not provide for Fintechs/TPPs to retrieve cardholder data from a single repository, such as an interchange network, when cardholder authentication is typically managed by the cardholder's bank.

BRIEF DESCRIPTION OF THE DISCLOSURE

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a computing system is provided. The computing system includes a database, a communication interface receiving, from a cardholder computing device, a secure request message, and one or more processors. The processor(s) is programmed to perform operations including receiving, via the communication interface, a consent message from the cardholder computing device. The consent message includes cardholder consent information indicating consent to one or more data services. The processor(s) is also programmed to perform operations including receiving, via the communication interface, transaction card details from the cardholder computing device. The transaction card details correspond to a transaction card of a cardholder and are associated with a financial account of the cardholder. Furthermore, based on the transaction card details, the processor(s) is programmed to generate a digital access token by a token service system. The digital access token is associated with the financial account and the cardholder consent information. In addition, the processor(s) is programmed to perform operations including storing the digital access token in the database; transmitting, via the communication interface, a cardholder authentication request message to computing device of an issuer of the transaction card; and receiving, via the communication interface, an authentication identifier (ID) from the cardholder computing device. Based on the received authentication ID, the processor(s) is programmed to authenticate the cardholder and transmit, via the communication interface, the digital access token to a third party provider computing device based on authenticating the cardholder.

In another aspect, a computer-implemented method performed by a network system is provided. The network includes a cardholder computing device, a third party provider computing device, an authentication provider computing device, a consent provider computing device, and an open service API. The method includes receiving, at the third party provider computing device, an access approval message from the cardholder computing device, and receiving, at the authentication provider computing device, a request message from the third party provider computing device to create an authentication session. Furthermore, the method includes transmitting, by the authentication provider computing device, an authentication identifier (ID) to the cardholder computing device and authenticating the cardholder computing device at the authentication provider computing device. The method also includes receiving, at the consent provider computing device, a request from the authentication provider computing device to create a consent session, and transmitting, by the consent provider computing device, a list of data services to which the third party provider computing device is requesting access. Moreover, the method includes receiving, at the consent provider computing device, a consent message from the cardholder computing device. The consent message includes cardholder consent information indicating consent to one or more of the data services. Furthermore, the method includes receiving, at the consent provider computing device, transaction card details from the cardholder computing device. The transaction card details correspond to a transaction card of a cardholder and being associated with a financial account of the cardholder. The method also includes transmitting, by the consent provider computing device, a request to generate a digital access token by the open service API based on the transaction card details and the cardholder consent information, and transmitting, by the consent provider computing device, the digital access token to the cardholder computing device.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
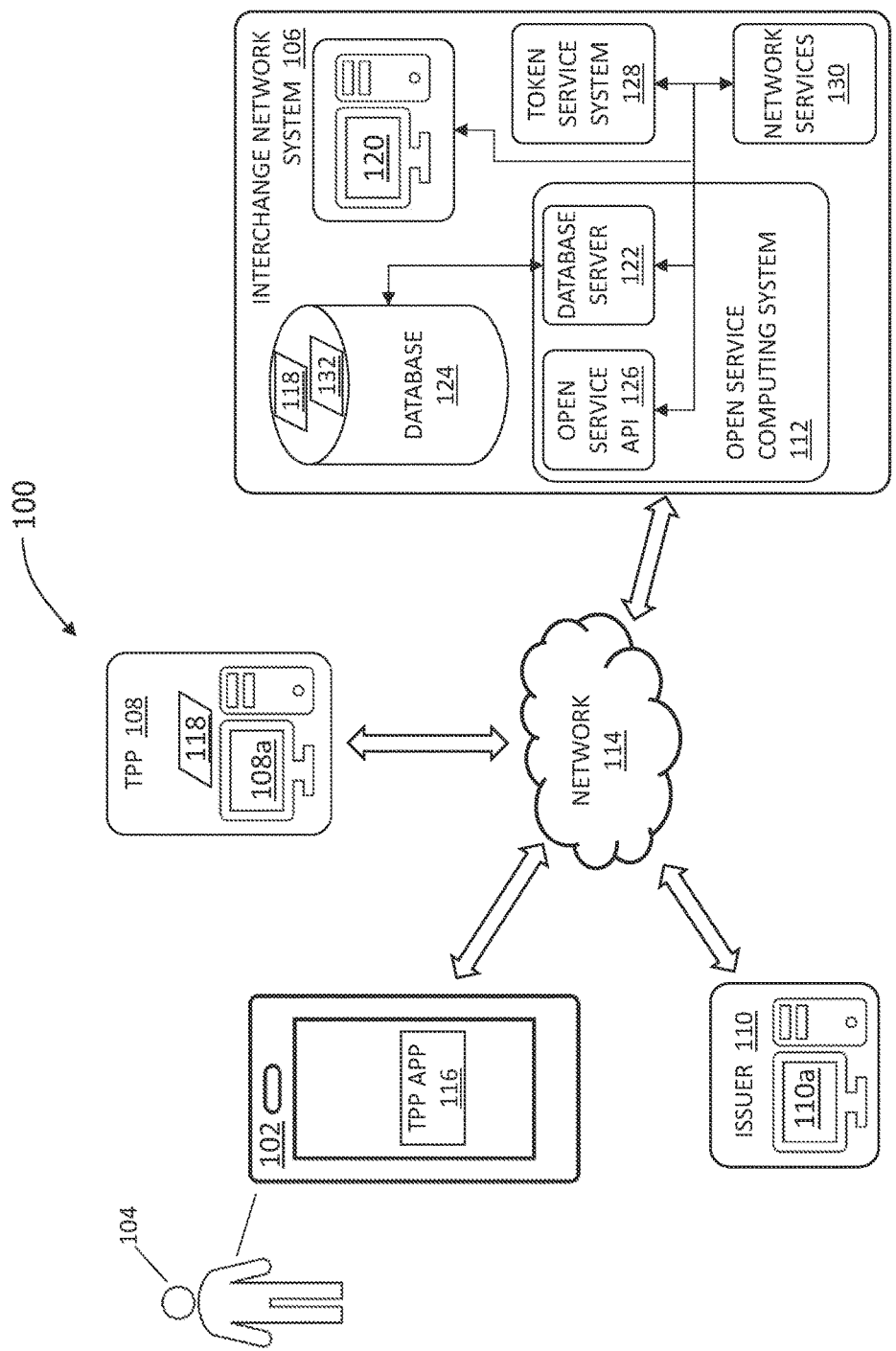
FIG. 1 is a block diagram of an example multi-party network system including a cardholder computing device belonging to a cardholder (or consumer), in accordance with one embodiment of the present disclosure.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION OF THE DISCLOSURE

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled.

As used herein, the term "database" includes either a body of data, a relational database management system (RDBMS), or both. As used herein, a database includes, for example, and without limitation, a collection of data including hierarchical databases, relational databases, flat file databases, object-relational databases, object oriented databases, and any other structured collection of records or data that is stored in a computer system. Examples of RDBMS's include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase (Sybase is a registered trademark of Sybase, Dublin, Calif.), and PostgreSQL® (PostgreSQL is a registered trademark of PostgreSQL Community Association of Canada, Toronto, Canada). However, any database may be used that enables the systems and methods to operate as described herein.

As used herein, the terms "payment card," "transaction card," and "financial transaction card," may include any suitable transaction card, such as a credit card, a debit card, a charge card, a membership card, a promotional card, an identification card, a prepaid card, a gift card, and/or any other card-type device that may hold payment account information. Each type of transaction card can be used as a method of payment for performing a transaction.

Furthermore, as used herein, the term "real-time" includes at least one of the times of occurrence of the associated events, the time of collection of data, the time to process the data, and the time of a system response to the events and the environment. For the activities and the events in the embodiments described herein as occurring in real-time, it should be assumed that they occur substantially instantaneously.

Exemplary Access Token System

FIG. 1 is a block diagram of an example multi-party network system 100, including a cardholder computing device 102 (e.g., a mobile computing device) belonging to a cardholder (or consumer) 104, in accordance with one embodiment of the present disclosure. In the exemplary embodiment, the network system 100 provides interchange network services offered by one or more payment networks, such as interchange network system 106. In addition, the network system 100 enables financial data transactions and services related to transaction cards in which cardholders 104, third party providers (TPPs) 108 (also may be referred to herein as Fintechs), and card issuers (e.g., issuer 110) do not need to have a one-to-one relationship. Although parts of the network system 100 are presented in one arrangement, other embodiments may include the same or different parts arranged otherwise, depending, for example, on authentication and consent processes, communication between computing devices, etc.

It is noted that TPPs, such as TPP 108, and Fintechs provide cardholders, such as cardholder 104, access to new products and services related to a cardholder's financial accounts. TPPs/Fintechs include, for example, account information service providers (AISPs), payment initiation service providers (PISPs), etc. Examples include PayPal®, Square®, Stripe®, etc. In order for the TPPs/Fintechs to provide account services to a cardholder, the TPPs/Fintechs require access to the cardholder's financial information.

In the example embodiment, the network system 100 generally includes the cardholder computing device 102, the interchange network system 106 including an open service computing system 112, the TPP 108 (via a third party provider computing device 108*a*), and the issuer 110 (via an issuer computing device 110*a*) coupled in communication via a communications network 114. The network 114 includes, for example and without limitation, one or more of a local area network (LAN), a wide area network (WAN) (e.g., the Internet, etc.), a mobile network, a virtual network, and/or any other suitable public and/or private network capable of facilitating communication among the cardholder computing device 102, the open service computing system 112, the interchange network system 106, the issuer 110, and/or the TPP 108. In some embodiments, the network 114 includes more than one type of network, such as a private transaction network provided by the interchange network system 106 to the TPP 108, and the issuer 110, and, separately, the public Internet, which may facilitate communication between the cardholder computing device 102, the TPP 108, the issuer 110, the open service computing system 112, and/or the interchange network system 106, etc.

Embodiments described herein relate to transaction card systems, such as a credit card payment system using the Mastercard® interchange network. (Mastercard is a registered trademark of Mastercard International Incorporated.) The Mastercard interchange network is a set of proprietary communications standards promulgated by Mastercard International Incorporated for the exchange of financial transaction data and the settlement of funds between financial institutions that are members of Mastercard International Incorporated.

With continued reference to FIG. 1, in the exemplary embodiment, the cardholder computing device 102 (e.g., a smartphone or other computing device used by the cardholder 104) includes a user interface (not labelled) that facilitates user interaction with the respective cardholder computing device 102. For example, and without limitation, the user interface enables the cardholder 104 to input information to the cardholder computing device 102, and the cardholder computing device 102 to output information to the cardholder 104 (e.g., on a display of the cardholder computing device 102). The user interface includes, for example, one or more TPP Applications 116 (broadly, a TPP App), which is installed on the cardholder computing device 102. In the exemplary embodiment, the TPP App 116 provides communication to the TPP 108 (via the TPP computing device 108*a*) and various financial services to the cardholder 104 via the TPP 108. It is contemplated that fewer or more TPP Apps may be installed on the cardholder computing device 102 and displayed by the user interface, where each TPP App is associated with at least one financial service provider (e.g., the TPP 108).

In the exemplary embodiment, the cardholder computing device 102 communicates with one or more of the issuer 110 (via the issuer computing device 110*a*) and the TPP 108 (via the TPP computing device 108*a*), for example, via the network 114. In addition, the cardholder computing device 102 communicates with the open service computing system 112, for example, via the network 114, to exchange and/or synchronize authentication, consent, and/or financial account data via the TPP App 116. The open service computing system 112 accesses the network 114 to communicate with the cardholder computing device 102, the issuer 110, and the TPP 108 to facilitate the establishment of one or more digital access tokens 118, and the exchange of cardholder financial account data with the issuer 110 and the TPP 108.

The cardholder computing device 102 can be any computing device capable of interconnecting to the network 114, such as the Internet, including a desktop computer, laptop, mobile web-based device, smartphone, PDA, or other mobile web-based connectable equipment. The cardholder computing device 102 is interconnected to the Internet through one or more interfaces including a network, such as a local area network (LAN) or a wide area network (WAN), dial-in-connections, cable modems, wireless modems, and special high-speed ISDN lines. In addition, in the example embodiment, the cardholder computing device 102 is configured to communicate with other cardholder computing devices (not shown) and/or merchant point-of-sale (POS) systems (not shown) using various forms of communication including, for example, radio frequency communication, near field communication (NFC), network-based communication, and the like.

The network system 100 includes, for example, and without limitation, one or more computers, servers, networks of multiple computing devices, virtual computing devices, and the like. In addition, in the exemplary embodiment, the network system 100 also includes one or more payment network server systems 120 (also referred to as a payment system), which is part of the interchange network system 106 and is coupled in communication to the network 114. The payment system 120 is a computer including, for example, a web application, an application programming interface (API) server, and a memory device, enabling the interchange network system 106 to be in communication with the open service computing system 112 using, for example, and without limitation, an internal network and/or the Internet. The payment system 120 is interconnected to the Internet through one or more interfaces including a network, such as a local area network (LAN) or a wide area network (WAN), dial-in-connections, cable modems, and special high-speed ISDN lines. The payment system 120 can be any computing device capable of interconnecting to the Internet. In certain embodiments of the present invention, the open service computing system 112 is integrated with or is otherwise a part of the payment network server system 120.

The open service computing system 112 includes, for example, a database server 122, which is connected to a database 124. In one embodiment, the database 124 is stored on the open service computing system 112. In an alternative embodiment, the database 124 may be stored remotely from the open service computing system 112 and/or may be non-centralized. The database 124 is configured to receive and store, at least, one or more digital access tokens 118, account data and/or information associating respective access tokens 118 to respective cardholder accounts, cardholder consent data associated with the respective access tokens 118, and/or other data or information associated with the access tokens 118 (e.g., token status, expiry date, authorized TPP, etc.).

Furthermore, the open service computing system 112 includes an open service application programming interface (API) 126. In the exemplary embodiment, the open service API 126 facilitates the creation of the access token 118 for the TPP 108. The open service API 126 also facilitates obtaining cardholder consent for creating the access token 118, obtaining cardholder account data, and authenticating the cardholder 104. The open service API 126 stores the access tokens 118 and associated data or information in the database 124.

In the exemplary embodiment, the cardholder computing device 102 is used to run the TPP App 116, which establishes a connection with an associated TPP 108. The TPP 108 provides financial services to the cardholder 104 via the TPP App 116. To provide the financial services, the TPP 108 may require access to certain cardholder financial account data (e.g., transaction alerts, transaction history, virtual card numbers, card controls, etc.) that is held by the interchange network system 106. However, because the cardholder financial account data belongs to the cardholder, it is generally only shared with the issuer of the cardholder's transaction card/account, such as the issuer 110. To gain access to the cardholder financial account data, the TPP 108 must receive consent from the cardholder 104.

In the exemplary embodiment, the TPP 108 requests the cardholder 104 to link one or more transaction card accounts with the TPP service, for example, via the TPP App 116. If the cardholder agrees, the TPP 108 communicates with the open service computing system 112 and transmits a secure request message to authenticate the cardholder and receive access to cardholder financial account data. For example, in one embodiment, the TPP 108 may generate a JSON web token (JWT) and launch a web SDK with the JWT within the TPP App 116. The JWT may contain information concerning the access the TPP 108 is requesting. For example, the JWT may contain information indicating that the TPP 108 is requesting access to one or more of a cardholder's transaction alerts, transaction history, virtual card numbers, card controls, etc.

The open service API 126 receives the secure request message and communicates with the cardholder computing device 102 to authenticate the cardholder and retrieve cardholder consent. For example, in one embodiment, the open service API 126 presents to the cardholder 104, via a lightbox popup window, a list of the data services the APP 108 is requesting access to. The cardholder 104 may consent to granting access to one or more of the requested data services. In one embodiment, the cardholder 104 may simply transmit a consent message to the open service API 126, for example, by pressing an icon on the user interface of the TPP App 116. The consent message includes one or more data fields including cardholder consent information indicating consent to one or more data services requested by the TPP 108 and offered by the interchange network system 106, where each data field corresponds to a respective one of the data services. In another embodiment, the cardholder 104 may select one or more of the requested data services and transmit a consent message including only those data fields corresponding to the cardholder selected data services.

Upon receipt of the cardholder's consent message, the open service computing system 112 analyzes the received data, for example, to determine the data services to which the cardholder 104 consented to being accessed by the TPP 108. The open service API 126 then requests the transaction card details from the cardholder 104 for the cardholder account to be associated with the cardholder consent. The open service API 126, via the open service computing system 112, then requests a token service system 128 to tokenize the card details. In the exemplary embodiment, the interchange network system 106 includes the token service system 128, which is configured to generate or assign one or more access tokens, such as access token 118, to respective cardholder transaction card accounts. The token service system 128 generates or assigns an access token to be associated with the cardholder's transaction card and creates an association mapping between the access token and the transaction card. The token service system 128 stores the token-to-card mapping data (e.g., in a data mapping table) in a database, such as the database 124. The token service system 128 then communicates with the issuer 110 to facilitate authenticating the cardholder 104.

In a typical transaction card system, the issuer 110 is the financial institution that issues the transaction card, such as a credit card, to the cardholder 104. Using the interchange network 106, the token service system 128 communicates with computers of the issuer 110 to initiate cardholder authentication, for example, by transmitting a cardholder authentication request message. For example, in one embodiment, the token service system 128 generates an authentication identifier (ID), such as a one-time password (OTP), and transmits it to the issuer 110 with the cardholder authentication request message. The issuer 110 subsequently transmits the authentication ID (or OTP) to the cardholder computing device 102. To authenticate the cardholder, the open service computing system 112 requests the authentication ID from the cardholder, for example, via the TPP App 116. If the authentication ID received from the cardholder computing device 102 matches the authentication ID generated by the token service system 128, the cardholder 104 is considered to be authenticated. In some embodiments, the authentication ID may be generated by the issuer 110. In such embodiments, the token service system 128 receives the authentication ID from the issuer 110 and a subsequent authentication ID from the cardholder computing device 102. A match indicates that the cardholders is authenticated.

Upon authenticating the cardholder 104, the token service system 128 transmits the access token (e.g., access token 118) to the TPP 108, for example, via the open service computing system 112, such that the access token can be used in subsequent data service requests initiated by the TPP 108. In some embodiments, the open service computing system 112 may receive an access token revocation request from one or more of the cardholder 104 and the issuer 110. The revocation request instructs the open service computing system 112 to suspend or otherwise terminate the use of the access token by the TPP 108.

The embodiments illustrated and described herein as well as embodiments not specifically described herein but within the scope of aspects of the invention constitute exemplary means for generating and providing an access token, such as the access token 118, to a third party provider, such as the TPP 108, thereby granting access to a cardholder's financial account data. For example, the cardholder computing device 102, the open service computing system 112, the token service system 128, or any other similar computer device(s), specially programmed with computer-executable instructions to execute processes and techniques with a processor as described herein, constitute exemplary means for enabling a cardholder, such as the cardholder 104, to provide his or her transaction card information to a third party provider (e.g., the TPP 108) and consent to the third party provider retrieving certain financial account data of the cardholder 104 from a data store (e.g., the interchange network system 106). The TPP 108 uses an access token 118 to access various network services 130 of the interchange network system 106 to retrieve the cardholder's financial account data.

Exemplary Computer Systems

Figure 2:
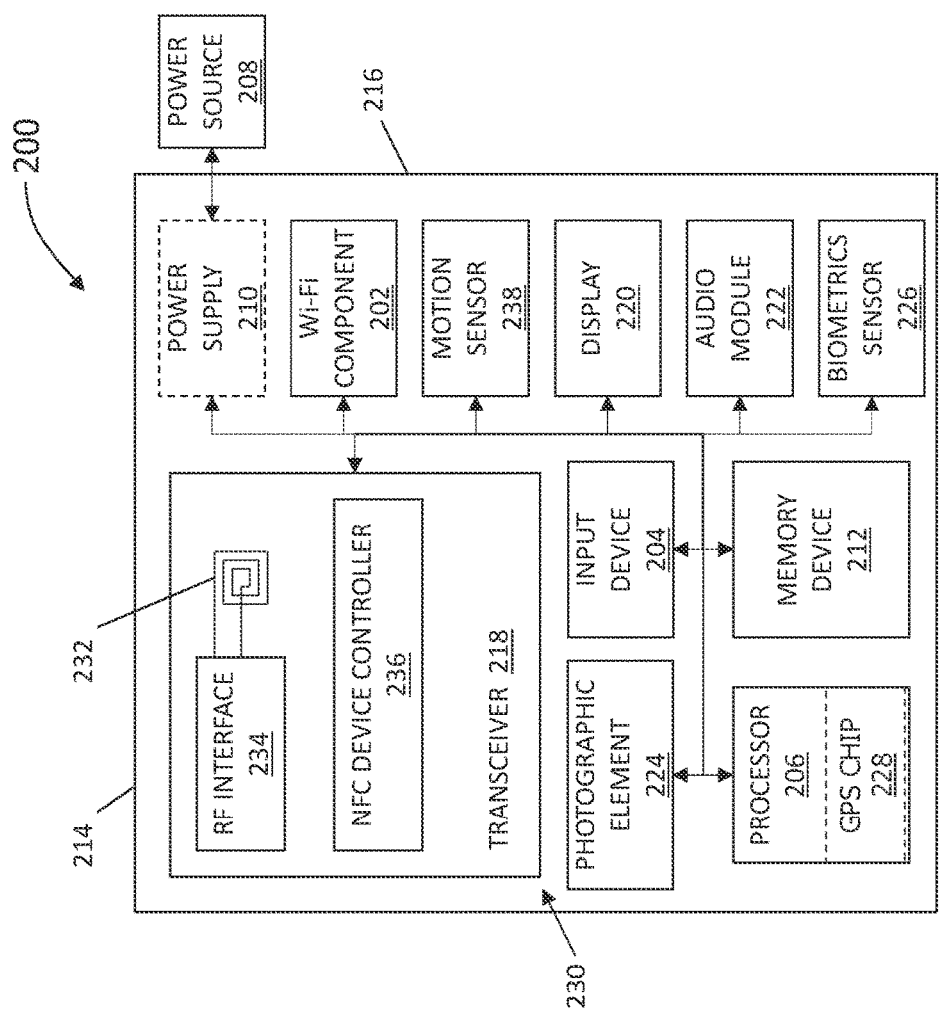
FIG. 2 is an example configuration of the cardholder computing device shown in FIG. 1 that may be operated by a cardholder shown in FIG. 1.

FIG. 2 is an example configuration of a user computing system 200, such as the cardholder computing device 102 (shown in FIG. 1), that may be operated by a user, such as the cardholder 104 (shown in FIG. 1). In the exemplary embodiment, the computing system 200 is a computing device configured to connect to one or more of the open service computing system 112, the issuer 110, the TPP 108, and any other computing devices, such as other customer computing devices (not shown).

In the exemplary embodiment, the computing system 200 generally includes a processor 206, a memory device 212, a transceiver 218 (or a wireless communication device), a photographic element 224, and a biometrics sensor 226. In addition, the computing system 200 includes an integrated Wi-Fi component 202 (e.g., implementing the Institute of Electrical and Electronics/IEEE 802.11 family of standards), an input device 204, a display 220, and an audio module 222. Moreover, the computing system 200 includes an internal power supply 210 (e.g., a battery or other self-contained power source) to receive power, or alternatively, in some embodiments, the computing system 200 may include an external power source 208. Optionally, the computing system 200 may include a motion sensor 238.

The processor 206 includes one or more processing units (e.g., in a multi-core configuration) specially programmed for executing computer readable instructions. The computer readable instructions may be executed within a variety of different operating systems (OS) on the cardholder computing device 102, such as UNIX, LINUX, Microsoft Windows®, etc. More specifically, the computer readable instructions may cause various data manipulations on data stored in the memory device 212 (e.g., create, read, update, and delete procedures). It should also be appreciated that upon initiation of a computer-based method, various computer readable instructions may be executed during initialization. Some operations may be required to perform one or more processes described herein, while other operations may be more general and/or specific to a programming language (e.g., C, C#, C++, Java, or other suitable programming languages, etc.). The memory device 212 is any device allowing information such as the computer readable instructions and/or written works to be stored and retrieved. The memory device 212 includes one or more computer readable media.

In the example embodiment, the processor 206 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for conducting cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

Because the computing system 200 may be widely deployed, it may be impractical to manually update software for the computing system 200. Therefore, the network system 100 provides a mechanism for automatically updating the software on the computing system 200. For example, an updating mechanism may be used to automatically update any number of components and their drivers, both network and non-network components, including system level (OS) software components. In some embodiments, the computing system 200 components are dynamically loadable and unloadable; thus, they may be replaced in operation without having to reboot the OS.

A location of the computing system 200 can be obtained, for example, via a location service (e.g., global positioning system (GPS) service) in the computing system 200, "ping" data that includes geotemporal data, from cell location register information held by a telecommunications provider to which the computing system 200 is connected, and the like. For example, in one suitable embodiment, an optional GPS chip 228 can be part of or separate from the processor 206 to enable the location of the computing system 200 to be determined.

Stored in the memory device 212 are, for example, computer readable instructions for providing a user interface to the user via the display 220 and, optionally, receiving and processing input from the input device 204. A user interface may include, among other possibilities, a web browser and the TPP App 116 (shown in FIG. 1). Web browsers enable users, such as the cardholder 104, to display and interact with media and other information typically embedded on a web page or a website. The TPP App 116 allows the user to interact with computers of the TPP 108 and the open service computing system 112 to provide transaction card details, cardholder consent, and cardholder authentication information thereto.

The photographic element 224 may include a camera or other optical sensor and lens combination capable of generating a video signal and capturing an image. In various embodiments, the photographic element 224 may be integrated in a housing or body, such as a housing 214, of the computing system 200. When the photographic element 224 captures an image or otherwise generates image data (e.g., video data), the photographic element 224 may store the image data in a data file, either in a raw or compressed format, in the memory device 212.

The biometrics sensor 226 is a biometric input device coupled in communication with at least the processor 206 and the memory device 212. The biometrics sensor 226 enables the user to enter a biometric sample. For example, the biometrics sensor 226 is a hardware component and includes, for example, an integral fingerprint or palm reader/scanner, retinal or iris reader/scanner, camera, and/or voice reader/recorder. The user inputs one or more biometrics and stores them as a biometric profile in the memory device 212. The biometrics of the user, such as the cardholder 104, includes one or more scans or digital representations of physical features of the user that are to be validated/authenticated during generation of the access token 118. The biometrics or physical features can include, for example, and without limitation, voice, fingerprint, iris, vein pattern, face, or the like. Feature data from a biometric scan or digital representation may be extracted to select features of interest.

The biometric profile may be further stored, for example, by the issuer 110 and/or the interchange network system 106 in the database 124.

In some embodiments, the motion sensor 238 may include one or more sensor elements that facilitate detecting a person's presence. For example, if the computing system 200 is operating as the cardholder computing device 102, the motion sensor 238 detects when the cardholder 104 moves or raises the cardholder computing device 102. Upon detection of such motion, the photographic element 224 may begin capturing images (e.g., still or video images), the transceiver 218 may be activated, and/or the audio module 222 may begin capturing audio. The motion sensor 238 may be operatively coupled to the photographic element 224 such that the person's presence may be detected by detecting motion using the photographic element 224. The motion sensor 238 may include, for example, and without limitation, sensor elements such as a passive infrared sensor, an ambient light sensor, and the like.

In the example embodiment, the display 220 can include, for example, and without limitation, a liquid crystal display (LCD), an organic light emitting diode (OLED) display, or an "electronic ink" display. In some embodiments, a single component such as a touch screen may function as both an output device (e.g., the display 220) and the input device 204. As such, the display 220 may optionally include a touch controller for support of touch capability. In such embodiments, the computing system 200 may detect a person's presence by detecting that the person has touched the display 220 of the computing system 200.

The audio module 222 may include, for example, and without limitation, a speaker and related components capable of broadcasting streaming and/or recorded audio and may also include a microphone. The microphone facilitates capturing audio through the computing system 200.

In the example embodiment, the computing system 200 includes the housing 214 at least partly (and more preferably, at least substantially or entirely) enclosing the components described above. In addition, the computing system 200 includes circuitry 230 configured to communicate with the network 114 (shown in FIG. 1) and/or other computing devices (e.g., other cardholder computing devices, the open service computing system 112, the issuer 110, the TPP 108, etc.). The circuitry 230 may include, for example, leads, connectors, NFC-enabled circuitry, Wi-Fi-enabled circuitry, and photographic element circuitry. The housing 214 is preferably configured to seal the circuitry 230, which is susceptible to degradation from the ambient environment. In one embodiment, the circuitry 230 is hermetically sealed in the housing 214. For example, in one embodiment, the circuitry 230 is completely and permanently encased within the housing 214. In other words, the housing 214 and the circuitry 230 are intended to remain as a single, inseparable unit throughout the life of the cardholder computing device 102. It is understood that the housing 214 can be formed separately from the circuitry 230 and that the circuitry 230 can be placed into and sealed within the housing 214 in a separate operation. It is also understood that the housing 214 can be oversized with respect to the circuitry 230 so that the circuitry 230 can be placed loosely into the housing 214. In another embodiment, the circuitry 230 can be selectively, sealingly enclosed within the housing 214, where the housing 214 includes a closure 216 removably attached to a body of the housing 214.

The housing 214 is fabricated from a suitably selected material that facilitates inhibiting the effect the material has on the signal being emitted from, for example, the transceiver 218 and/or the Wi-Fi component 202 and passing through the housing material. For example, and without limitation, suitable materials from which the housing 214 may be fabricated include polyethylene, propylene, isoprene, and butylenes (i.e., polyolefins). In other embodiments, the housing 214 is fabricated from any material that enables the computing system 200 to function as described herein, such as metals, etc.

In one embodiment, the transceiver 218 includes an antenna 232. The antenna 232 includes a looped wire configured to transmit radio signals when current flows through the looped wire. The antenna 232 is any size, shape, and configuration that is suitable for transmitting signals as described herein. For example, the antenna 232 is a tuned circuit configured to transmit radio signals in any radio-based communication system including, but not limited to, Radio Frequency Identification (RFID), Wireless Local Area Network (WLAN), and Wireless Personal Area Network (WPAN) systems. In the example embodiment, the antenna 232 generates a magnetic field when it vibrates at a selected frequency. Specifically, the antenna 232 is configured to vibrate at a frequency of about 13.56 MHz, which is suitable for use in a near field communication (NFC) system.

In the example embodiment, the antenna 232 transmits radio signals to and receives radio signals from other NFC-enabled computing devices, for example, another cardholder computing device, merchant point-of-sale (POS) systems (not shown), and/or any other components used in NFC systems. In NFC systems, at least one NFC component generates a magnetic field to inductively transfer currents and, thereby, exchange signals and information with other NFC components positioned within the magnetic field. In the exemplary embodiment, the antenna 232 functions as an NFC component to send and receive signals. The antenna 232 is configured to transmit radio signals to NFC components positioned within the magnetic field of the antenna 232, such as when the cardholder computing device 102 is located within a predetermined distance of another cardholder computing device and/or a merchant point-of-sale system (not shown). Therefore, the magnetic field generated by the antenna 232 defines the active range of the computing system 200. Additionally, the antenna 232 receives radio signals from NFC components when the antenna 232 is positioned within the magnetic field of the NFC components.

The transceiver 218 also includes a radio frequency (RF) interface 234 and an NFC device controller 236. The RF interface 234 and the NFC device controller 236 are powered by the power source 208, and in some embodiments, the internal power supply 210 and/or the display 220. In addition, the processor 206 and the memory device 212 are powered in the same manner. The RF interface 234 is configured to receive and transmit RF signals through the antenna 232. The NFC device controller 236 is configured to process the received RF signals and to generate signals to be transmitted by the RF interface 234. The memory device 212 is configured to store data associated with transmitting and receiving the RF signals. The NFC device controller 236 is coupled in communication with the processor 206.

In some embodiments, the computing system 200 may be connected to one or more peripheral devices (not shown). That is, the computing system 200 may communicate various data with one or more peripheral devices. For example, the computing system 200 may communicate with one or more peripheral devices through the Wi-Fi component 202, the transceiver 218, or other suitable means.

Figure 3:
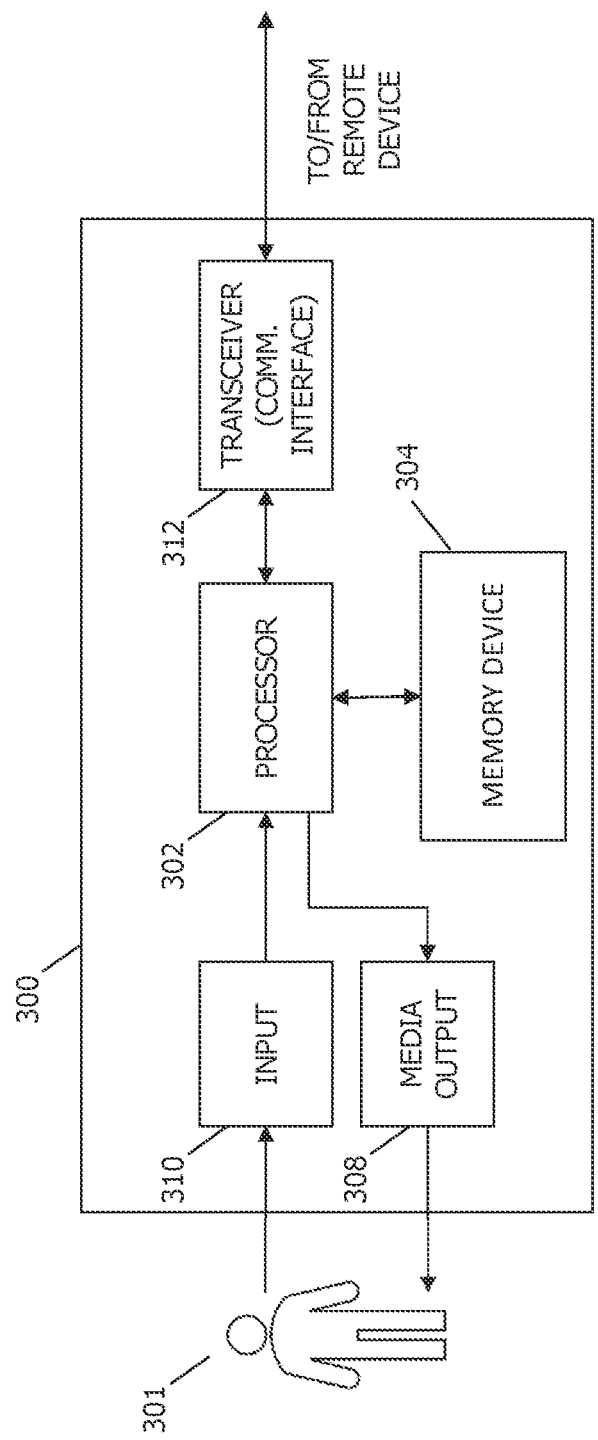
FIG. 3 is an example configuration of a computing system for use in the network system shown in FIG. 1.

FIG. 3 is an example configuration of a computing system 300 operated by a user 301. In some embodiments, the computing system 300 is the open service computing system 112 (shown in FIG. 1), the payment system 120 (shown in FIG. 1), and/or a computing system of the TPP 108 or issuer 110.

In the example embodiment, the computing system 300 includes one or more processors 302 for executing computer readable instructions. In some embodiments, computer readable instructions are stored in a memory device 304. The processor 302 may include one or more processing units arranged, for example, in a multi-core configuration. The memory device 304 is any device allowing information such as executable instructions, data, and/or written works to be stored and retrieved. The memory device 304 includes one or more computer readable media.

The computing system 300 also includes at least one media output component 308 for presenting information to the user 301. The media output component 308 is any component capable of conveying information to the user 301. In some embodiments, the media output component 308 includes an output adapter such as a video adapter and/or an audio adapter. An output adapter is operatively coupled to the processor 302 and operatively connectable to an output device such as a display device, a liquid crystal display (LCD), organic light emitting diode (OLED) display, or "electronic ink" display, or an audio output device, a speaker, or headphones.

In some embodiments, the computing system 300 includes an input device 310 for receiving input from the user 301. The input device 310 may include, for example, a touch sensitive panel, a touch pad, a touch screen, a stylus, a photographic element or camera, an optical sensor, a gyroscope, an accelerometer, a position detector, a keyboard, a pointing device, a mouse, or an audio input device. A single component such as a touch screen may function as both an output device of the media output component 308 and the input device 310. The computing system 300 may also include a transceiver 312 (broadly, a communication interface), which is communicatively connectable to a remote device such as the cardholder computing device 102 (shown in FIG. 1). The transceiver 312 may include, for example, a wired or wireless network adapter or a wireless data transceiver for use with radio frequency communication, near field communication (NFC), and/or with a mobile phone network, Global System for Mobile communications (GSM), 3G, or other mobile data network, and/or Worldwide Interoperability for Microwave Access (WiMax) and the like.

Stored in the memory device 304 are, for example, computer readable instructions for providing a user interface to the user 301 via the media output component 308 and, optionally, receiving and processing input from the input device 310. A user interface may include, among other possibilities, a web browser and various software applications. Web browsers enable users to display and interact with media and other information typically embedded on a web page or a website. The various software applications allow the user 301 to interact with the computing system 300 to further communicate with the cardholder computing device 102, the open service computing system 112, etc. to facilitate providing various financial services to the cardholder 104 and, optionally, execute a transaction upon delivery of such services.

Figure 4:
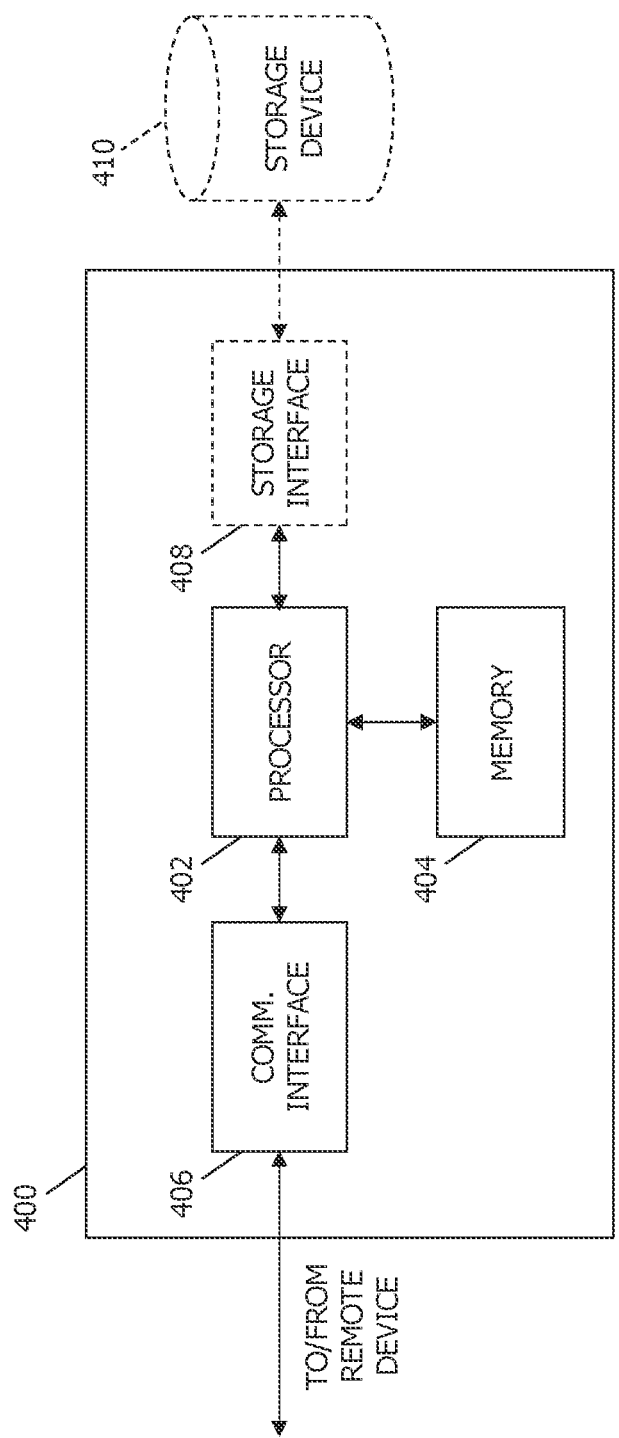
FIG. 4 is an example configuration of a server system for use in the network system shown in FIG. 1.

FIG. 4 is an example configuration of a server system 400, such as the database server 122 (shown in FIG. 1). In the example embodiment, the server system 400 includes a processor 402 for executing computer readable instructions. The computer readable instructions may be stored in a memory area 404, for example. The processor 402 includes one or more processing units (e.g., in a multi-core configuration) for executing the computer readable instructions. The computer readable instructions may be executed within a variety of different operating systems on the server system 400, such as UNIX, LINUX, Microsoft Windows®, etc. More specifically, the computer readable instructions may cause various data manipulations on data stored in a storage device 410 (e.g., create, read, update, and delete procedures). It should also be appreciated that upon initiation of a computer-based method, various computer readable instructions may be executed during initialization. Some operations may be required to perform one or more processes described herein, while other operations may be more general and/or specific to a programming language (e.g., C, C#, C++, Java, or other suitable programming languages, etc.).

The processor 402 is operatively coupled to a communication interface 406 such that the server system 400 can communicate with a remote device such as cardholder computing device 102, a computing system 300, or another server system. For example, the communication interface 406 may receive communications from the open service computing system 112.

The processor 402 is operatively coupled to the storage device 410. The storage device 410 is any computer-operated hardware suitable for storing and/or retrieving data. In some embodiments, the storage device 410 is integrated in the server system 400. In other embodiments, the storage device 410 is external to the server system 400 and is like the database 124 (shown in FIG. 1). For example, the server system 400 may include one or more hard disk drives as the storage device 410. In other embodiments, the storage device 410 is external to the server system 400 and may be accessed by a plurality of server systems 400. For example, the storage device 410 may include multiple storage units such as hard disks or solid-state disks in a redundant array of inexpensive disks (RAID) configuration. The storage device 410 may include a storage area network (SAN) and/or a network attached storage (NAS) system.

In some embodiments, the processor 402 is operatively coupled to the storage device 410 via a storage interface 408. The storage interface 408 is any component capable of providing the processor 402 with access to the storage device 410. The storage interface 408 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 402 with access to the storage device 410.

The memory area 404 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

In some embodiments, it is contemplated that the server system 400 is implemented as a software application. In such embodiments, the hardware described above, such as the processor 402, the memory area 404, the communication interface 406, and/or the storage interface 408 may be shared with the hardware components of a computing system 300, such as the processor 302, the memory device 304, and/or the transceiver 312.

Exemplary Computer-Implemented Method

Figure 5:
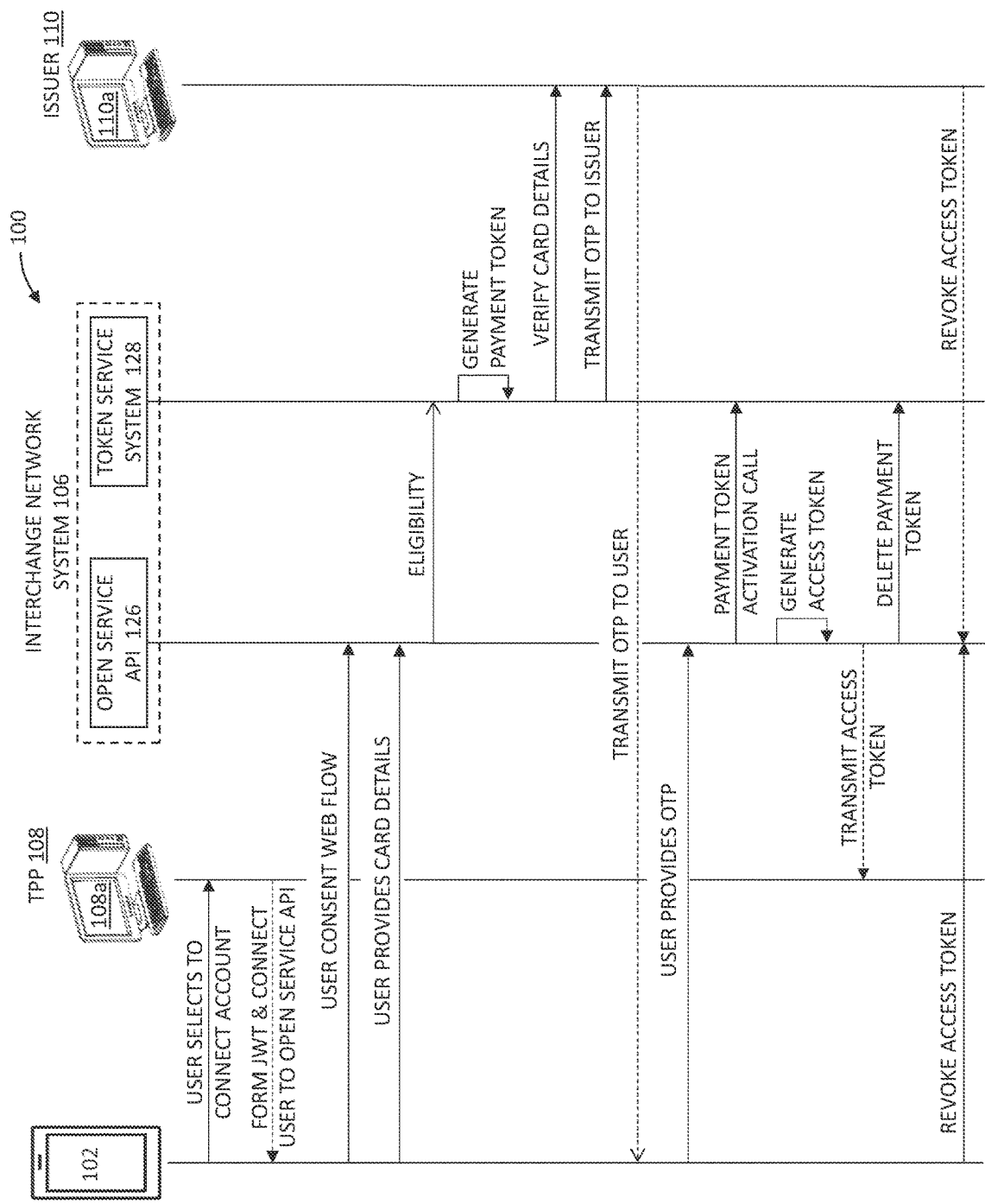
FIG. 5 depicts a flowchart illustrating various example actions performed by components of the network system shown in FIG. 1 to authenticate a cardholder and obtain cardholder consent for creating an access token.

FIG. 5 is a flowchart illustrating various example actions performed by components of the network system 100 to authenticate a cardholder and obtain cardholder consent for creating an access token. In the exemplary embodiment, a cardholder selects to connect to his or her account with a third party provider (TPP 108). More specifically, a computer of the TPP 108 receives an input from the cardholder computing device 102, for example, via the TPP App 116 over the network 114 (each shown in FIG. 1), indicating that the cardholder, such as the cardholder 104 (shown in FIG. 1), selected to connect a transaction card account to the TPP 108.

The TPP 108 forms a JSON web token (JWT) and launches a webSDK with the JWT within the TPP App 116. The web SDK is configured to connect the TPP App 116 to the interchange network system 106, and more particularly, to the open service API 126. The JWT is a data object that holds JSON (Java Script Object Notation) that asserts one or more claims (or fields). The JWT contains information concerning the access the TPP 108 is requesting (contained in the claims). For example, the JWT may contain information indicating that the TPP 108 is requesting access to one or more of a cardholder's transaction alerts, transaction history, virtual card numbers, card controls, etc. Upon launching the web SDK with the JWT in the TPP App 116, an API call to the open service API 126 is initiated by the TPP App 116. The API call includes a request for authentication of the cardholder 104. Because the API call is provided with the JWT, the API call is secure. That is, the JWT provides for securely transmitting information between parties as a JSON object.

The cardholder 104, via the cardholder computing device 102, and more particularly, the TPP App 116, is presented with a consent screen to provide user consent and to agree to any presented terms and conditions of the consent. In one particular embodiment, the open service API 126 may integrate a user consent widget, lightbox, web-redirect, iframe, or the like, in the TPP App 116 to allow the cardholder 104 to provide his or her consent.

Upon receipt of the cardholder's consent, the open service API 126 then presents, to the cardholder 104, via the cardholder computing device 102, and more particularly, the TPP App 116, an input screen to enter and submit the cardholder's transaction card details associated with the account to which the cardholder 104 is granting access to the TPP 108 for retrieving financial account data. In one particular embodiment, the open service API 126 may integrate a card detail widget, lightbox, web-redirect, iframe, or the like, in the TPP App 116 to allow the cardholder 104 to provide his or her transaction card details. In the exemplary embodiment, the transaction card details includes one or more of a primary account number (PAN), an expiry date, a card verification code (CVC), and the cardholder's name and address.

The open service API 126 transmits the transaction card details to the token service system 128 to determine (e.g., check, verify, etc.) the eligibility of the transaction card (e.g., via the PAN) for having an access token generated and associated therewith. For example, the token service system 128 may compare the PAN (or transaction card details) against a range of enrolled PANs (or enrolled transaction cards) that are determined to be eligible for the token service. Alternatively, the token service system 128 may verify that the issuer of the transaction card is enrolled in the token service for its associated transaction cards. As is understood by one skilled in the art, there are various methods for determining the eligibility of a specific PAN for a token service.

If the transaction card is eligible, the token service system 128 generates a payment token 132 (shown in FIG. 1) and stores it in a database, such as the database 124 (shown in FIG. 1). In one embodiment, the payment token 132 is stored in a data mapping table along with the cardholder consent, transaction card details, token expiration, etc. As such, the payment token 132 is mapped to the transaction card, associated financial account, cardholder consent, etc. In some embodiments, the token service system 128 stores the payment in a suspended state. For example, a status of the stored payment token 132 is set or changed to a suspended state. As such, the payment token 132 is not able to be used until and unless it is further switched to an active or unsuspended state. In the exemplary embodiment, the payment token 132 is not usable until the cardholder 104 is authenticated.

As illustrated in FIG. 5, after the payment token 132 is generated, the token service system 128 communicates with the issuer 110 and transmits a card verification message to verify some of the transaction card details received from the cardholder 104 via the TPP App 116. For example, in one embodiment, the token service system 128 transmits one or more of a CVC value and cardholder address to the issuer for validation.

In the exemplary embodiment, if the issuer 110 confirms (i.e., validates) that the CVC and/or cardholder address match those stored by the issuer 110, the token service system 128 transmits an authentication request message to the issuer 110. For example, the token service system 128 generates an authentication ID (or one-time password (OTP)), embeds it in the authentication request message, and transmits it to the issuer to be used in cardholder authentication. In certain other embodiments, the authentication request message does not include an authentication ID, but rather a request that the issuer generate the authentication ID (or OTP) and transmit it to the cardholder for authentication. The issuer 110 authenticates the cardholder 104 using any method, including, for example, single factor authentication, multifactor authentication, biometrics, and the like. In such embodiments, the issuer further provides an authentication ID to the cardholder after authenticating the cardholder 104 using one of the methods described above. In addition, the authentication message transmitted to the cardholder computing device is also transmitted to the token service system 128

The issuer 110 transmits the authentication ID (or OTP) to the cardholder 104, and more particularly, to the cardholder computing device 102. The authentication ID is be transmitted to the cardholder computing device 102 via any suitable technique, such as via an SMS or text message service, push notification, email, voice (e.g., via telephone call or voice message services), and the like. Upon receipt of the authentication ID, the cardholder 104 provides the authentication ID (or OTP) to the open service API 126 via the TPP App 116 to confirm authentication.

The open service API 126 transmits the received authentication ID to the token service system 128 via a payment token activation call to verify that the received authentication ID matches the generated authentication ID (e.g., either the token service system 128 generated authentication ID or the issuer 110 generated authentication ID). The token service system 128 compares the received authentication ID to the generated authentication ID. If the received authentication ID matches the generated authentication ID, the cardholder is authenticated. If the received authentication ID does not match, the cardholder is not authenticated and the token service system 128 deletes the payment token 132.

Upon authentication of the cardholder 104, the open service API 126 generates an access ID (or card reference), such as the digital access token 118, and stores it in a database, such as the database 124 (shown in FIG. 1). In one embodiment, the digital access token 118 is stored in a data mapping table along with the cardholder consent, transaction card details, token expiration, etc., which is associated with the payment token 132. As such, the digital access token 118 is mapped to the transaction card, associated financial account, cardholder consent, etc. for recall when used in subsequent API calls for access to cardholder financial account data.

After the access token 118 is generated, the open service API 126 transmits the access token 118 to the TPP 108. For example, the open service API 126 may communicate with the third party provider computing device 108*a* to transmit the digital access token 118 thereto. The TPP 108 stores the access token 118 for subsequent use in API calls to the open service API 126 for retrieval of financial account data of the cardholder, subject to the cardholder consent associated with the access token 118. The open service API 126 then transmits a payment token delete call to the token service system 128, requesting that the payment token 132 be deleted.

In certain embodiments, the cardholder 104 and/or the issuer 110 may revoke the access token 118. That is, the cardholder 104 and/or the issuer 110 may transmit a token revocation request message to the open service API 126 to request that the access token be suspended and/or deleted such that the access token 118 can no longer be used to retrieve cardholder financial account data. In one embodiment, the cardholder 104 may transmit a revocation request message to the open service API 126 via the TPP App 118. In another embodiment, the cardholder 104 may log in to an issuer App and request that the access token 118 be revoked. In such an embodiment, the issuer 110 transmits a revocation request to the open service API 126 to request that the access token 118 be suspended and/or deleted. It is also noted that the issuer 110 may request revocation of the access token 118 on its own, rather than a request being initiated by the cardholder 104.

Upon receipt of the token revocation request message, the open service API 126 instructs the token service system 128 to revoke or delete the digital access token 118. For example, the token service system 128 may change the status to the digital access token to a suspended state or delete the digital access token from the a data mapping table in the database 124.

The systems and methods described above provide for generating an access token based on cardholder consent and authentication. The access token allows third party providers (TPPs) to retrieve certain financial account data of a cardholder, wherein financial account data is associated with a selected transaction card of the cardholder. The access token is limited to the consent provided by the authenticated cardholder and can be revoked by the cardholder and/or the transaction card issuer upon request. As described herein, the access tokens facilitate enabling TPPs to use financial data services of an interchange network system whether or not the transaction card issuer participates in the process. In addition, the disclosed techniques allow the fraud controls/models of the interchange network system and the issuer to be used when generating the access tokens and in subsequent data requests vis APIs of the interchange network system.

Exemplary User Authentication System

Figure 6:
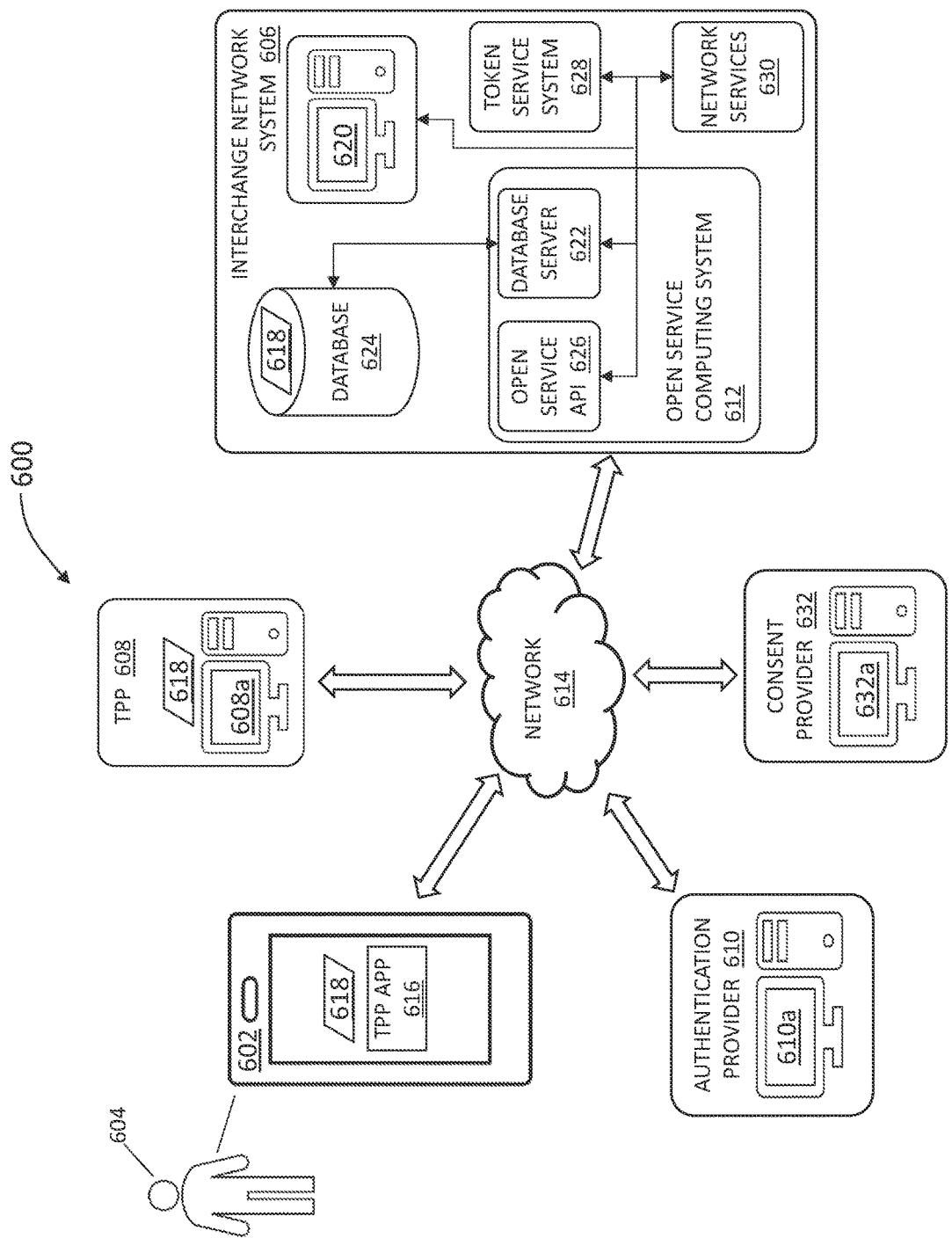
FIG. 6 is a block diagram of another example multi-party network system, including a cardholder computing device belonging to a cardholder (or consumer), in accordance with another embodiment of the present disclosure.

FIG. 6 is a block diagram of another example multi-party network system 600, including a cardholder computing device 602 (e.g., a mobile computing device) belonging to a cardholder (or consumer) 604, in accordance with another embodiment of the present disclosure. In the exemplary embodiment, the network system 600 provides interchange network services offered by one or more payment networks, such as interchange network system 606. In addition, the network system 600 enables financial data transactions related to transaction cards in which the cardholders 604, third party providers (TPPs) 608 (also may be referred to herein as Fintechs), authentication providers 610, and consent providers 632 do not need to have a one-to-one relationship. Although parts of the network system 600 are presented in one arrangement, other embodiments may include the same or different parts arranged otherwise, depending, for example, on authentication and consent processes, communication between computing devices, etc. It is noted that in some embodiments, the one or more of the authentication providers 610, the consent providers 632, and the interchange network system 606 can be the same organization. For example, one organization may function as both an authentication provider and a consent provider. Furthermore, one organization may function as both a consent provider and the interchange network system.

In the example embodiment, the network system 600 generally includes the cardholder computing device 602, the interchange network system 606 including an open service computing system 612, the TPP 608 (via a third party provider computing device 608*a*), the authentication provider 610 (via an authentication provider computing device 610*a*), and the consent provider 632 (via a consent provider computing device 632*a*) coupled in communication via a communications network 614. The network 614 includes, for example and without limitation, one or more of a local area network (LAN), a wide area network (WAN) (e.g., the Internet, etc.), a mobile network, a virtual network, and/or any other suitable public and/or private network capable of facilitating communication among the cardholder computing device 602, the open service computing system 612, the interchange network system 606, the authentication provider 610, the consent provider 632, and/or the TPP 608. In some embodiments, the network 614 includes more than one type of network, such as a private transaction network provided by the interchange network system 606 to the TPP 608, the authentication provider 610, and the consent provider 632, and, separately, the public Internet, which may facilitate communication between the cardholder computing device 602, the TPP 608, the authentication provider 610, the consent provider 632, the open service computing system 612, and/or the interchange network system 606, etc.

Embodiments described herein relate to transaction card systems, such as a credit card payment system using the Mastercard® interchange network, as previously identified.

With continued reference to FIG. 6, in the exemplary embodiment, the cardholder computing device 602 (e.g., a smartphone or other computing device used by the cardholder 104) includes a user interface (not labelled) that facilitates user interaction with the respective cardholder computing device 602. For example, and without limitation, the user interface enables the cardholder 604 to input information to the cardholder computing device 602, and the cardholder computing device 602 to output information to the cardholder 604 (e.g., on a display of the cardholder computing device 602). The user interface includes, for example, one or more TPP Applications 616 (broadly, a TPP App), which is installed on the cardholder computing device 602. In the exemplary embodiment, the TPP App 616 provides communication to the TPP 608 (via the TPP computing device 608a) and various financial services to the cardholder 604 via the TPP 608. It is contemplated that fewer or more TPP Apps may be installed on the cardholder computing device 602 and displayed by the user interface, where each TPP App is associated with at least one financial service provider (e.g., the TPP 608).

In the exemplary embodiment, the cardholder computing device 602 communicates with one or more of the authentication provider 610 (via the authentication provider computing device 610a), the consent provider 632 (via the consent provider computing device 632a), and the TPP 608 (via the TPP computing device 608a), for example, via the network 614. In addition, the cardholder computing device 602 communicates with the open service computing system 612, for example, via the network 614, to exchange and/or synchronize authentication, consent, and/or financial account data via the TPP App 616. The open service computing system 612 accesses the network 614 to communicate with the cardholder computing device 602, the authentication provider 610, the consent provider 632, and the TPP 608 to facilitate the establishment of one or more access tokens 618, and the exchange of cardholder financial account data with the TPP 608.

The cardholder computing device 602 can be any computing device capable of interconnecting to the network 614, such as the Internet, including a desktop computer, laptop, mobile web-based device, smartphone, PDA, or other mobile web-based connectable equipment. The cardholder computing device 602 is interconnected to the Internet through one or more interfaces including a network, such as a local area network (LAN) or a wide area network (WAN), dial-in-connections, cable modems, wireless modems, and special high-speed ISDN lines. In addition, in the example embodiment, the cardholder computing device 602 is configured to communicate with other cardholder computing devices (not shown) and/or merchant point-of-sale (POS) systems (not shown) using various forms of communication including, for example, radio frequency communication, near field communication (NFC), network-based communication, and the like.

The network system 600 includes, for example, and without limitation, one or more computers, servers, networks of multiple computing devices, virtual computing devices, and the like. In addition, in the exemplary embodiment, the network system 600 also includes one or more payment network server systems 620 (also referred to as a payment system), which is part of the interchange network system 606 and is coupled in communication to the network 614. The payment system 620 is a computer including, for example, a web application, an application programming interface (API) server, and a memory device, enabling the interchange network system 606 to be in communication with the open service computing system 612 using, for example, and without limitation, an internal network and/or the Internet. The payment system 620 is interconnected to the Internet through one or more interfaces including a network, such as a local area network (LAN) or a wide area network (WAN), dial-in-connections, cable modems, and special high-speed ISDN lines. The payment system 620 can be any computing device capable of interconnecting to the Internet. In certain embodiments of the present invention, the open service computing system 612 is integrated with or is otherwise a part of the payment network server system 620.

The open service computing system 612 includes, for example, a database server 622, which is connected to a database 624. In one embodiment, the database 624 is stored on the open service computing system 612. In an alternative embodiment, the database 624 may be stored remotely from the open service computing system 612 and/or may be non-centralized. The database 624 is configured to receive and store, at least, one or more access tokens 618, account data and/or information associating respective access tokens 618 to respective cardholder accounts, cardholder consent data associated with the respective access tokens 618, and/or other data or information associated with the access tokens 618 (e.g., token status, expiry date, authorized TPP, etc.).

Furthermore, the open service computing system 612 includes an open service application programming interface (API) 626. In the exemplary embodiment, the open service API 626 facilitates the creation of the access token 618 for the TPP 608. The open service API 626 also facilitates obtaining cardholder consent for creating the access token 618, obtaining cardholder account data, and authenticating the cardholder 604, for example, via one or more web flows with the authentication provider 610 and the consent provider 632. The open service API 626 stores the access tokens 618 and associated data or information in the database 624.

Figure 7:
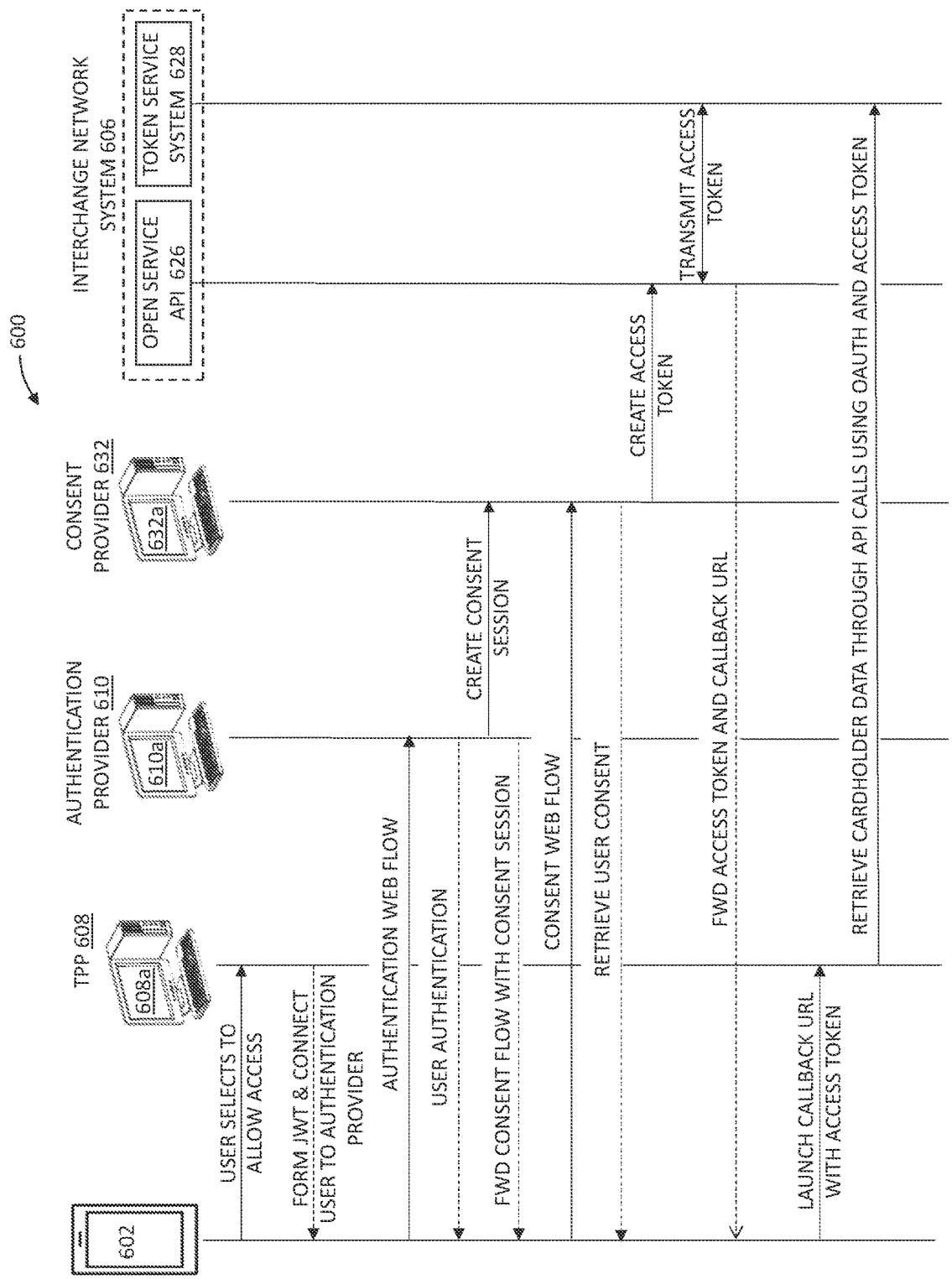
FIG. 7 depicts a flowchart illustrating various example actions performed by components of the network system shown in FIG. 6 to link cardholder authentication and consent to API calls.

FIG. 7 is a flowchart illustrating various example actions performed by components of the network system 600 to link cardholder authentication and consent to API calls. In the exemplary embodiment, the cardholder computing device 602 is used to run the TPP App 616, which establishes a connection with an associated TPP 608. The TPP 608 provides financial services to the cardholder 604 via the TPP App 616. To provide the financial services, the TPP 608 may require access to certain cardholder financial account data (e.g., transaction alerts, transaction history, virtual card numbers, card controls, etc.) held by the interchange network system 606. However, because the cardholder financial account data belongs to the cardholder, it is generally only shared with the issuer of the cardholder's transaction card/account. To gain access to the cardholder financial account data, the TPP 608 must receive consent from the cardholder 604.

In the exemplary embodiment, the TPP 608 requests the cardholder 604 to link one or more transaction card accounts with the TPP service, for example, via the TPP App 616. If the cardholder 604 agrees, the cardholder computing device 602 transmits an access approval message to a computing device of the TPP 608. The TPP 608 communicates with the authentication provider 610 and transmits a request message to request the creation of an authentication session and links the cardholder computing device 602 thereto. For example, in one embodiment, the TPP 608 generates a JSON web token (JWT) including, for example, a set of predefined claims, their Client ID, creation time, validity period, customer redirect URL, and any application specific data. The TPP 608 signs the JWT with their key and uses it to initiate the authentication and consent web flows. The TPP 608 connects the cardholder computing device 602 to the authentication provider 610 with the JWT within the TPP App 616. The application specific data in the JWT contains, for example, information concerning the access the TPP 608 is requesting. For example, the JWT contains information indicating that the TPP 608 is requesting access to one or more of a cardholder's transaction alerts, transaction history, virtual card numbers, card controls, etc.

The authentication provider 610 communicates directly with the cardholder 604, via the cardholder computing device 602, to authenticate the cardholder 604. For example, in one suitable embodiment, the authentication provider 610 generates an authentication identifier (ID) (such as a one-time password (OTP)) and transmits it to the cardholder computing device 602. To authenticate the cardholder, the authentication provider 610 requests the authentication ID from the cardholder 604, for example, via the TPP App 616. If the authentication ID received from the cardholder computing device 602 matches the one generated by the authentication provider 610, the cardholder 104 is considered to be authenticated.

Upon authenticating the cardholder 104, the authentication provider 610 communicates with the consent provider 632 to transmit a consent request message to create a consent session with the JWT. For example, the authentication provider 610 passes the cardholder request message and the authenticated user details to the consent provider 632 and receives back a user consent session token. The authentication provider 610 connects the cardholder computing device 602 (using a redirect with the consent session token) to the consent provider 632 so that the cardholder consent is collected for sharing data with the TPP 608.

The consent provider 632 receives the consent session request message and communicates directly with the cardholder computing device 602 to receive cardholder consent for allowing the TPP 608 to access or receive cardholder financial data from the interchange network system 606. For example, in one embodiment, the consent provider 632 presents to the cardholder 104, via a lightbox popup window within the TPP App 616, a list of the data services to which the APP 108 is requesting access. The cardholder 104 may consent to granting access to one or more of the requested data services. In one embodiment, the cardholder 604 may simply transmit a consent message to the consent provider 632, for example, by pressing an icon on the user interface of the TPP App 616. In another embodiment, the cardholder 604 may select one or more of the requested data services and transmit a consent message to the consent provider 632 indicating consent only to the selected data services.

Upon receipt of the cardholder's consent message, the consent provider 632 analyzes the received data, for example, to determine the data services to which the cardholder 604 consented to being accessed by the TPP 608. The consent provider 632 then requests that the transaction card details from the cardholder 604 for the cardholder account to be associated with the cardholder consent. The consent provider 632 communicates directly with the interchange network system 606, for example, via the open service API 626 and requests that a special relationship between the TPP 608 and the cardholder 604 (using the consent given) be created. The consent provider 632 receives back an access token 618 for that relationship.

More particularly, the open service API 626, via the open service computing system 612, requests a token service system 628 to tokenize the card details. In the exemplary embodiment, the interchange network system 606 includes the token service system 628, which is configured to generate or assign one or more access tokens, such as the access token 618, to respective cardholder transaction card accounts. The token service system 628 generates or assigns an access token to be associated with the cardholder's transaction card and creates an association mapping between the access token 618 and the transaction card. The token service system 628 stores the token-to-card mapping data (e.g., in a data mapping table) in a database, such as the database 624. The token service system 628 then communicates with the consent provider 632 to transmit the access token 618 thereto. The consent provider 632 transmits the access token 618 in a web flow redirect to the cardholder computing device 602 for use in subsequent OAuth calls by the TPP 608 to the open service API 626 of the interchange network system 606. Revocation of the digital access token may be initiated by the cardholder 604 as described herein with respect to FIG. 5.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as a field-programmable gate array (FPGA), to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor comprises a general-purpose processor configured using software, the general-purpose processor may be configured as respective different processors at different times. Software may accordingly configure the processor to constitute a particular hardware configuration at one instance of time and to constitute a different hardware configuration at a different instance of time.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

1. An interchange network system comprising:
   a data store comprising financial account data of a plurality of cardholders;
   a token service system;
   an open service computing system including a database, an open service application programming interface (API), a first one or more processors and a first one or more non-transitory computer readable media storing executable instructions that when executed by the first one or more processors, causes the first one or more processors to perform the operations of:
   executing the open service API a first time;
   receiving, via the executing open service API, a request to authenticate a cardholder of the plurality of cardholders with a JSON web token from a third party provider (TTP) computer, the JSON web token including a request for the TPP computer to access the financial account data of the cardholder from the data store;
   presenting, via the executing open service API, on a cardholder computing device, a consent screen including a list of one or more data services;
   receiving, via the executing open service API, a selection of one or more data services of the list of one or more data services associated with the request;
   after receiving the selection, presenting, via the executing open service API, a transaction card details input screen on the cardholder computing device;
   receiving, via the executing open service API, the transaction card details from the cardholder computing device, and transmitting, via the executing open service API, the received details to the token service system;

the token service system comprising a second one or more second processors and a second one or more non-transitory computer readable media storing executable instructions that when executed by the second one or more processors causes the second one or more processors to perform the operations of:

based on the received transaction card details, generating an access token and a payment token, wherein the access token and the payment token are associated with the financial account data;

generating an association between the access token, the payment token, and the received transaction card details, and storing the payment token and the association in the database;

authenticating the cardholder, wherein authenticating comprises:

receiving an authentication identifier (ID) from an issuer computer;

receiving a second ID from the cardholder computing device; and determining that the authentication ID and the second ID are the same; and after authenticating the cardholder, transmitting, via the first one or more processors, the access token to the TPP; and the first one or more non-transitory computer readable media storing executable instructions that when executed by the first one or more processors causes the first one or more processors to further perform the operations of:

executing the open service application API a second time;

receiving, via a token revocation request message from the cardholder computing device and/or the issuer computer; and, transmitting a message to delete the access token to the token service system;

the second one or more non-transitory computer readable media storing executable instructions that when executed by the second one or more processors causes the second one or more processors to further perform the operations of:

receiving the message to delete the access token; and, deleting the access token from the database.

2. The interchange network system in accordance with claim 1, the second one or more non-transitory computer readable media storing executable instructions that when executed by the second one or more processors causes the second one or more processors to further perform an operation of determining the eligibility of the transaction card for a token service.

3. The interchange network system in accordance with claim 1, the second one or more non-transitory computer readable media storing executable instructions that when executed by the second one or more processors causes the second one or more processors to further perform an operation of transmitting a card verification message to the issuer computing device.

4. The interchange network system in accordance with claim 1, the first one or more non-transitory computer readable media storing executable instructions that when executed by the first one or more processors causes the first one or more processors to further perform the operations of:

storing the digital access token in a data mapping table in the database; and associating the digital access token to the transaction card details, the financial account data, and a digital access token expiration date.

\* \* \* \* \*